Oct. 1, 1957 F. L. MOORE 2,808,268

SOUND TRANSLATING APPARATUS

Filed Feb. 2, 1951 3 Sheets-Sheet 1

INVENTOR
FRANK L. MOORE,

BY Raymond Whelton

ATTORNEYS

INVENTOR
FRANK L. MOORE,
BY Raymond W. Colton
ATTORNEY

Oct. 1, 1957 F. L. MOORE 2,808,268

SOUND TRANSLATING APPARATUS

Filed Feb. 2, 1951 3 Sheets-Sheet 3

INVENTOR
FRANK L. MOORE,
BY Raymond W. Colton
ATTORNEY

United States Patent Office 2,808,268

Patented Oct. 1, 1957

2,808,268

SOUND TRANSLATING APPARATUS

Frank L. Moore, Newington, Conn., assignor to The Gray Manufacturing Company, a corporation of Connecticut Application February 2, 1951, Serial No. 209,079

21 Claims. (Cl. 274—13)

This invention relates to sound translating apparatus applicable to widely differing types of record media and transducers.

The apparatus contemplated herein is of particular value where the sound track formed on the record medium includes adjacent lines of recording such as are commonly encountered with such record media as disks, cylinders, belts and tapes wherein the sound track usually assumes a helical or spiral form.

In the recording and reproduction of sound where such adjacent lines of recording are employed, two types of movement between the sound translating member and record medium are usually involved. A tracking movement occurs which is a movement in the direction of the sound track, and there is also an indexing movement which is customarily substantially normal to the tracking movement. Where relatively deep and coarse grooves are formed in the record medium, it has been common in the past to support the sound translating member on a freely pivoted arm and rely upon a stylus or other groove penetrating member for the scanning or indexing movement. Whereas this type of apparatus is relatively inexpensive and simple to produce, it is utterly inadequate where there are no grooves or where the grooves are closely spaced and shallow.

Where the number of lines of recording per inch are great, it has been customary in the art to achieve the indexing movement by means of a feed screw and a so-called half-nut to synchronize the indexing movement with the tracking movement, yet permit manual shifting of the sound translating head relative to the record by permitting an adjustment of the feed screw relative to the half-nut. In addition to the expense of producing such a mechanism so that it will provide the necessary accuracy, many operating and maintenance difficulties have been encountered with it. Moreover, such apparatus ordinarily requires rather involved, and therefore expensive, indexing arrangements, particularly where there is a need to expand the indexing movement. Even greater complexity of the indexing movement is encountered where a constant groove speed is employed in conjunction with a disk record and there is a need to produce an indication of the length of the recorded subject matter on a substantially uniform scale throughout the entire record.

It is among the objects of this invention to provide a simple and precise machine combining the advantages of the freely-pivoted arm type and the feed screw and half-nut type, which, despite its simplicity and reduced cost, produces faithful tracking even where the number of lines per inch on the record exceeds the maximum heretofore used commercially.

It is also among the objects of this invention to provide sound translating apparatus comprising a frame, a sound translating member carried by the frame for cooperation with a record, a record engaging member rotatably carried by the frame for movement with a record, record driving means carried by the frame for rotating the record engaging member, a carriage movably mounted on the frame supporting one of the members for movement relative to the other, and transmission means including a cable interconnecting the record driving means with the carriage, producing a relatively faithful drive from the record driving means through the cable to the carriage, yet permitting manual adjustment of the carriage relative to the driving means by slippage of the cable.

The apparatus may include an arm pivotally carried by the frame for movement about an axis, means connecting one of the members with the arm at a predetermined distance from the axis for movement with the arm, and transmission means including a cable interconnecting the record driving means with a portion of the arm more remote from the axis than the connecting means. The transmission means preferably provides reduction gearing intermediate the record driving means and the arm, and a cable drum with which the cable is ordinarily in frictional engagement by having an intermediate portion of the cable looped about the drum. The drum itself is preferably highly finished so as to present a relatively smooth surface in order that the cable can slip with respect thereto when the tension in the cable is reduced. This reduction of tension is achieved automatically by the use of tensioning means connected to the cable and to the arm producing a positive frictional drive from the drum to the cable under conditions of normal load, the tensioning means yielding under a predetermined load imposed axially of the cable to permit slippage of the cable relative to the drum. The cable drum is preferably in spaced relationship with respect to the pivotal axis of the arm, and the ends of the cable preferably engage substantially a common point of the arm with respect to which they are slidable, these ends being physically connected to the arm by spring means exerting a force assuring faithful movement of the cable responsive to rotation of the drum yet providing slippage of the cable on the drum and with respect to the common point of the arm when the arm is manually moved about its axis. This common point of the arm serves as guide means for the cable, and cable guides are likewise carried by the frame, the cable itself being suitably trained over such guides.

Under some circumstances it is preferred that one of the members be pivotally connected with the arm at a predetermined distance from the axis and under other circumstances it is preferred that one of the members be rigidly connected with the arm at a predetermined distance from the axis. Whereas one of the members may be connected with the arm at a predetermined distance from the axis for movement with the arm, means may be provided for securing the other of the members against movement with the arm. Guide means may be provided confining movement of the member with the arm to rectilinear movement. The member rotatably carried by the frame for movement with a record may assume the form of a record carriage. Certain embodiments contemplate a carriage movably supported by the frame, a sound translating member mounted on the carriage for cooperation with a record, and means connecting the carriage with the arm at a predetermined distance from the axis for movement with the arm. The invention also contemplates a carriage movably supported by the frame for each of the members and means connecting each of the members with the arm at a predetermined distance or predetermined distances from the axis for movement with the arm. Instead of an arm there may be a carriage pivotally carried by the frame for movement about an axis, means connecting one of the members with the carriage at a predetermined distance from the axis for arcuate movement with the carriage, and transmission means including a cable interconnecting the driving means with a portion of the carriage more remote from the axis than the connecting means. A plurality of carriages may be movably supported by the frame and a record engaging member may be rotatably mounted on one of the carriages, and there may be means connecting the carriages with the arm at predetermined distances from the axis for movement with the arm.

A record turntable member may be rotatably carried by the frame for movement with a record and there may be record driving means carried by the frame for rotating the turntable member, all of which would be most likely to occur in conjunction with a disk record. For use with a belt record, a record drum member may be rotatably carried by the frame for movement with a record, together with record driving means carried by the frame for rotating the drum member.

The record driving means may be of the constant groove speed type and the transmission means may include a cable interconnecting the record engaging member with a portion of the arm more remote from the axis than the connecting means.

The record engaging member may assume the form of a spindle and means may be provided connecting the spindle with the arm at a predetermined distance from its pivotal axis.

The apparatus preferably includes a position indicator connected to a portion of the arm remote from the axis. The cable drum may have an axis of rotation movable with one of the members, in which case the position of the drum axis may change during the course of a sound translating operation in the direction from which the cable moves towards the drum.

In one of its specific forms, the sound translating apparatus of the present invention comprises a frame, an arm pivotally carried by the frame for arcuate movement about an axis, a sound translating member carried by the arm at a predetermined distance from the axis for cooperation with a record, a rotatable spindle adapted to receive a record supported by the frame, record driving means carried by the frame for rotating the spindle, and transmission means including a cable interconnecting the spindle with a portion of the arm displaced from the axis an amount exceeding the predetermined distance.

A more complete understanding of the invention will follow from a detailed description of the accompanying drawings wherein.

Figure 1:
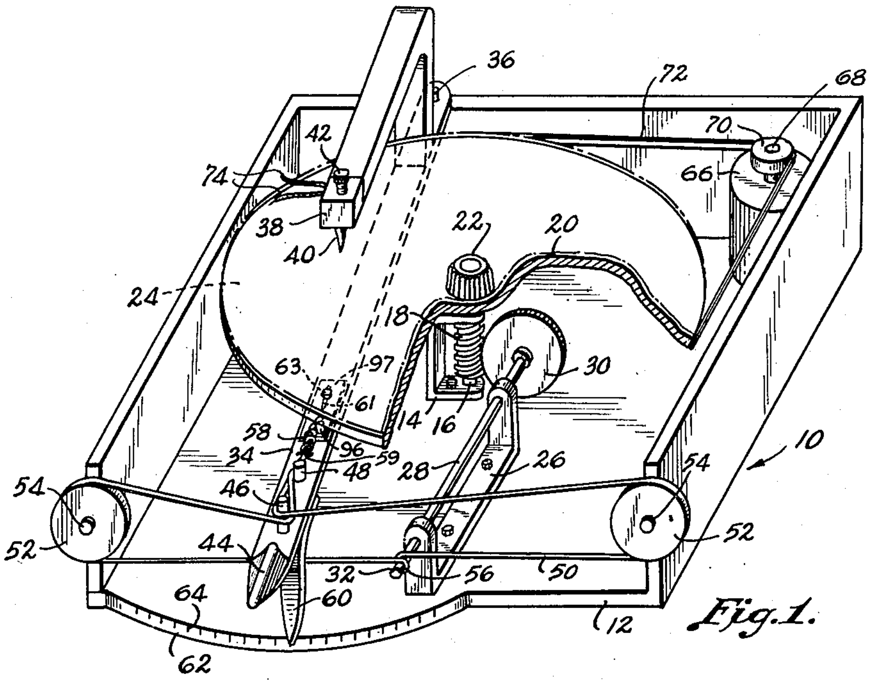
Fig. 1 is a somewhat diagrammatic perspective, partially broken away depicting one embodiment of the invention.

The sound translating apparatus shown in Fig. 1 comprises a frame 10 having a base 12 to which a bracket 14 is suitably secured to serve as a bearing support for a shaft 16 to an intermediate portion of which there is secured a worm 18 and to the upper end thereof there is secured a turntable 20 having a central splined stud 22 which is complementary with the central serrated opening of a disk record 24. Another bracket 26 is secured to the base 12 to support a horizontal shaft 28, one end of which carries a worm wheel 30 in engagement with the worm 18, and the other end of which serves as a cable drum 32. An arm 34 is connected with the frame 10 by means of a pivot 36, and spaced from the axis of this pivot, the arm carries a sound translating head 38 which can travel with the arm in an arcuate path over the surface of the record 24. The sound translating member is shown as having an element 40 projecting towards the record, which element may be a stylus or a magnetic pole, depending upon the type of record and type of medium employed. In any event, it is preferable that the element 40 be adjustable vertically to permit the insertion and removal of records, and for this purpose, an adjusting screw 42 has been depicted.

The arm 34 extends under the turntable 20 towards the front of the frame 10, terminating in a finger piece 44 for use in shifting the arm manually about its pivot. Near the forward end of the arm 34, two upstanding posts 46 and 48 are provided to serve as guides for a cable 50 which is trained over sheaves or guides 52 carried by shafts 54 which are in turn supported by the frame. An intermediate portion of the cable 50 contains a loop 56 about the drum 32, the ends of the cable being trained about a substantially common point of the post 46 in opposite directions and then in the same direction about the post 48, and secured against slipping with respect to one end of a spring 58 by tying the ends together and about the spring in a suitable knot 59. The other end of the spring 58 is suitably anchored to a post 96 carried by a bracket 97 containing a slot 61 for reception of a clamping screw 63 threadedly received by the arm 34. Thus the tension imparted to the cable by the spring can be adjusted to precisely the value required, and then fixed by securing the bracket 96 to the arm by tightening the screw 63. The post 48 serves to prevent such swinging movement of the spring 58 as would result in undesired displacement of the arm 34 relative to the cable 50.

Extending downwardly from the forward portion of the arm 34, there is provided a pointer or indicator 60 which moves with the arm to trasverse an arcuate scale 62 provided with calibrations 64 to serve as an expanded index, depicting on an amplified scale, relative movement between the stylus or other element 40 and the record 24. A driving motor 66 is carried by the frame and on its shaft 68 carries a pulley 70 for driving a belt 72 which is trained about the periphery of the turntable to effect the drive.

The sound translating head 38 has been shown as provided with electrical conductors 74 for connection with suitable amplifying equipment, not shown, for producing a recording or transcription in accordance with known principles.

When the motor 66 is energized, it will rotate the turntable 20 by means of the belt 72 and drive the record 24 with the turntable under the sound translating element 40 along the direction of the sound track already on the record or to be produced thereon. It is also necessary for the sound translating element 40 to receive an indexing motion so as to scan the record as the sound track progresses inwardly or outwardly on the record disk. This motion is produced through the worm 18 and wheel 30 which drives the shaft 28 and its cable drum 32 and in turn, the cable 50 whose loop 56 is maintained in positive and faithful driving relationship with the drum at the loads encountered by means of the spring 58. However, should it be desired to shift the arm 34, there is no need to perform any clutching or unclutching operation, but it is merely necessary to grasp the finger piece 44 and rotate the arm 34 about its pivot 36 by mere finger pressure. Assuming that it is desired to shift the finger piece 44 towards the right, as viewed in Fig. 1, tension would be introduced into the cable to the left of its loop 56, extending the spring 58 sufficiently to produce slack in the portion of the cable to the right of the loop 56 permitting the cable to slip with respect to the drum 32. Similarly, should it be desired to shift the finger piece 44 towards the left, as viewed in Fig. 1, the tension on the portion of the cable to the right of the loop 56 will extend the spring 58 introducing slack in that portion of the cable to the left of the loop, again permitting slippage about the drum and adjustment of the arm and the sound translating member 42 a desired position.

Figure 2:
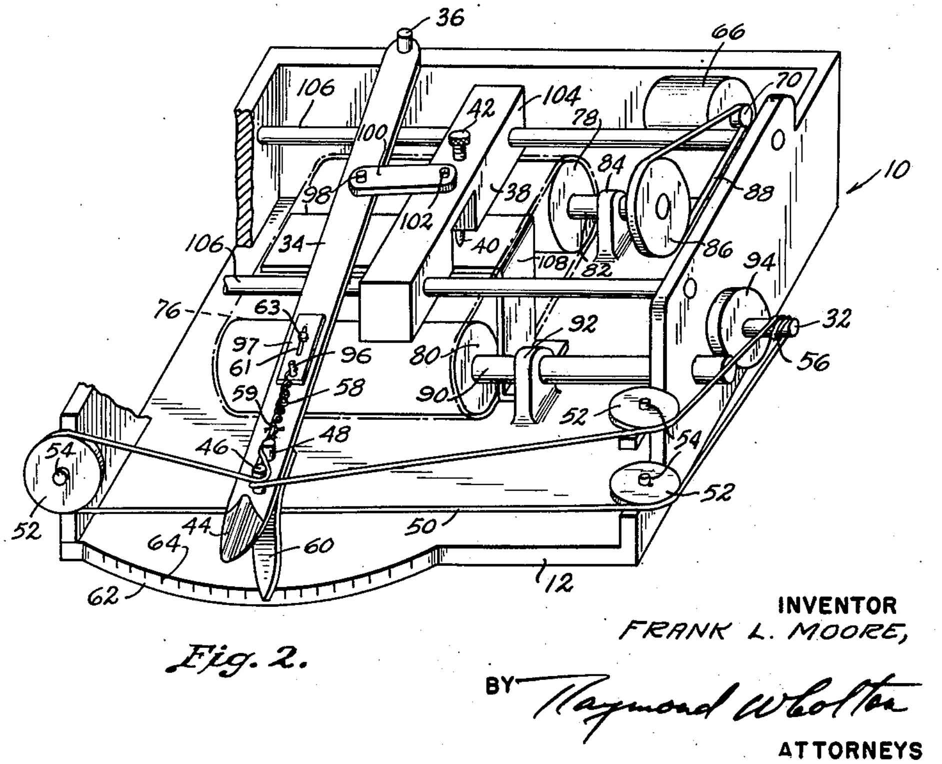
Fig. 2 is a somewhat diagrammatic perspective, partially broken away depicting another embodiment of the invention.

The embodiment depicted in Fig. 2 of the drawings exemplifies the use of the invention in conjunction with endless tape or belt types of record media wherein the record 76 is trained over a driving drum 78 and an idler drum 80. The drum 78 is secured to a shaft 82 which is journaled in a suitable bearing carried by a post 84, the outer ends of the shaft having a pulley 86 secured thereto for engagement with a belt 88 driven by the pulley 70 of the motor 66. Rotation of the drum 78 will drive the drum 80 through the record belt 76, the drum 80 being carried by a shaft 90 suitably journaled in a bearing carried by the post 92, the end of the shaft 90 projecting through the frame 10 and frictionally engaging the periphery of a rotor 94 rotatably supported by the frame and carrying a cable drum 32 about which the cable 50 is wrapped to form one or more loops 56. The cable is trained over suitable sheaves or pulleys 52 rotatably mounted on shafts 54 carried by the frame, approaching the end of the arm 34 from opposite directions, the ends of the cable being wrapped in opposite directions about the post 46 and in the same direction about the post 48 as in conjunction with the preceding figure, these ends of the cable being secured to one end of a spring 58 whose other end engages a post 96 anchoring it to the arm by means of an adjustable bracket 97 and clamping screw 63 as in the preceding examples.

In this embodiment, at a point spaced from its pivot 36, the arm carries a pin 98 for pivotal engagement with a link 100 whose opposite end receives a pivot pin 102 projecting from a carriage 104 on which the sound translating member 38 and its sound translating element 40 are carried. The carriage 104 is confined to rectilinear movement by a pair of guide rods 106, the right ends of which are supported in the frame 10 and whose left ends may be free or suitably supported if desired. Suitably spaced openings formed in the carriage 104 receive the rods 106, permitting the carriage to partake of a rectilinear movement as the arm 34 moves arcuately about its pivot 36. The upper surface of the record belt is suitably supported by an anvil 108 which is in turn, suitably supported by the frame 10, and preferably at the right end thereof to permit ready insertion and removal of a record belt 76. As will be understood by those familiar with this art, the anvil will maintain the surface of the record medium in predetermined relationship with respect to the sound translating element 40 whether it be a stylus or a portion of a magnetic head. Whereas electrical connections have not been shown in any of the figures for the motor nor in most of them for the sound translating member, it will be understood that such conductors are definitely contemplated for cooperation with the electrical circuits customarily employed with the sound recording and transcribing equipment.

When the motor 66 is energized, its pulley 70 will drive the belt 88 and the pulley 86 to rotate the shaft 82 and its drum 78, thereby driving the record belt 76 which imparts rotary motion to the drum 80 and its shaft 90. The drive thus far outlined will cause the record belt to travel under the stylus 40 to produce or translate a sound track. In order to advance the sound translating member across the width of the belt, it is necessary to produce an indexing movement. This is achieved by virtue of the fact that the shaft 90 of the drum 80 drives the rotor 94 and the cable drum 32 to drive the cable and thereby the arm 34 whose movements are converted into rectilinear motion of the carriage 104 through the link 100 which is connected to the arm by the pivot pin 98 and to the carriage by the pivot pin 102. Here again, manual movement of the arm and carriage can be achieved by merely grasping the finger piece 44 and shifting the arm to the left or right. As explained in conjunction with Fig. 1, when there is a tendency to move the arm in one direction manually, tension in the cable will be increased at one side of the loop to extend the spring 58 thereby relieving the tension in the cable at the other side of the loop, permitting the cable to slip about the drum. Also, as in the preceding figure, an indicator 60 is carried by the arm 34 for cooperation with calibrations 64 provided on a scale 62 formed arcuately on the base 12.

Inasmuch as many of the elements of the various figures are similar, they have been similarly identified by the reference numerals insofar as accuracy will permit.

Figure 3:
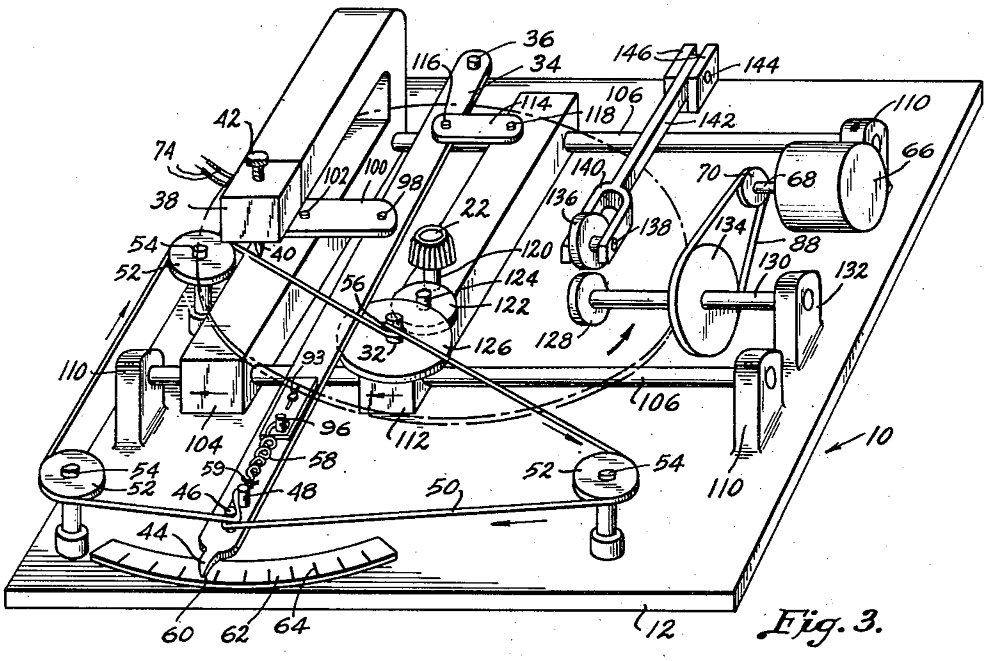
Fig. 3 is a somewhat diagrammatic perspective, depicting another embodiment of the invention.

The embodiment depicted in Fig. 3 of the drawings employs arrows to indicate the direction of movement of certain parts during a scanning operation. This arrangement contemplates a constant line speed record drive and a plurality of carriages movable with the pivoted arm at different rates, one carriage supporting the sound translating member and the other supporting the record engaging member. The guide rods 106 are supported in spaced relationship with respect to the base 12 by means of posts 110 to slidably support a carriage 104 for the sound translating member and a carriage 112 for the record engaging member. The sound translator carriage 104 is coupled with an intermediate portion of the arm 34 by means of the link 100 whose ends are pivotally received by a pivot pin 98 carried by the arm and a pivot pin 102 carried by the carriage. The record supporting carriage 112 is also coupled with the arm 34 by means of a link 114 whose ends receive a pivot pin 116 carried by the arm intermediate the pivot pin 36 and the pivot pin 98, and a pivot pin 118 projecting from the carriage 112. The carriage 112 rotatably supports a shaft 120 whose upper end supports the splined record receiving member 22 and whose periphery frictionally engages a roller 122 whose shaft 124 is also rotatably carried by the carriage 112, the periphery of this shaft frictionally engaging the periphery of a rotor 126 rotatably supported by the carriage 112 and having secured thereto the cable drum 32. As in the preceding figures, an intermediate portion of the cable 50 is wrapped around the drum 32 to provide a loop 56, the ends of the cable being trained about suitable sheaves or pulleys 52 rotatably carried on shafts 54 and then bent oppositely about the post or guide 46 carried near the end of the arm 34 and similarly about the post or guide 48 also carried by the arm, the ends of the cable being secured to one end of the spring 58 whose other end is anchored to the arm by means of the post 96. The forward end of the arm is provided with a finger piece 44 which is downturned to provide an indicator 60 for cooperation with the calibrations 64 borne by the scale 62.

The disk record 24 is shown as impaled on the splined member 22, the drive being achieved in this case by means of a friction roller 128 carried by a shaft 130 which is journaled in a bearing carried by a post 132. To an intermediate portion of the shaft 130, a pulley 134 is secured to receive the belt 88 which is driven by the pulley 70 carried by the shaft 68 of the motor 66. The driving roller 128 engages the lower surface of the record 24 and, when the friction between the roller and record surface is sufficient, the drive is achieved. To provide the necessary friction, a pressure roller 136 has been provided for engagement with the upper surface of the record 24, the pressure roller being carried by a shaft 138 which is journaled in the bifurcated end 140 of an arm 142 mounted by means of a pivot 144 between a pair of lugs 146 carried by the base 12. The arm 142 and its roller 136 can be biased by gravity or by means of a spring to provide sufficient bearing upon the upper surface of the record to render the drive by the roller 128 effective.

When the motor 66 is energized, the pulley 70 carried by its shaft 68 will drive the belt 88 and the pulley 134 to rotate the driving roller 128. Assuming that the pressure roller 136 is bearing upon the upper surface of the record, the record will be rotated at constant linear speed and will in turn drive through its splined receiving member 22, the shaft 120, the roller 122 and its shaft 124, and the rotor 126 and its drum 32 which in turn drives the cable 50, transmitting arcuate motion to the pivoted arm 34 which in turn transmits rectilinear motion to the carriages 104 and 112 through the links 100 and 114 respectively. Inasmuch as the link 100 is coupled to the arm 34 at twice the distance from the arm pivot 36 as is the link 114, it will follow that the carriage 104 will move twice as far as the carriage 112 for any given motion of the arm 34 and, for all positions of the arm, the distance from the sound translating element 40 to the record receiving member 22 will be the same as the distance from the rollers 128 and 136 to the record receiving member 22. Thus, constant line speed will be produced, and at the same time, any vibration introduced by or near the rollers 128 and 136 will be effectively isolated from the sound translating member 40 by virtue of the displacement of 180° between the rollers and sound translating member relative to the disk record shown. Moreover, the position of the sound translating element 40 will indicate directly the portion of the record being scanned, and if desired, even where the sound translating head is fixed in a horizontal plane, as in Figs. 4 and 6 to be described, a carriage similar to the sound translating member carriage 104 can be employed to provide this type of indication.

Whereas the cable driving arrangement and manual shifting is similar to that described with reference to the preceding figures, it will be noted in this case that the cable drum 32 not only rotates but its axis travels towards the left in the general direction from which the cable 50 approaches the drum. For any given line spacing, this movement of the drum axis in space, towards the direction from which the cable is moving, reduces the amount of reduction gearing required between the record receiving member 22 and the cable drum 32.

Figure 4:
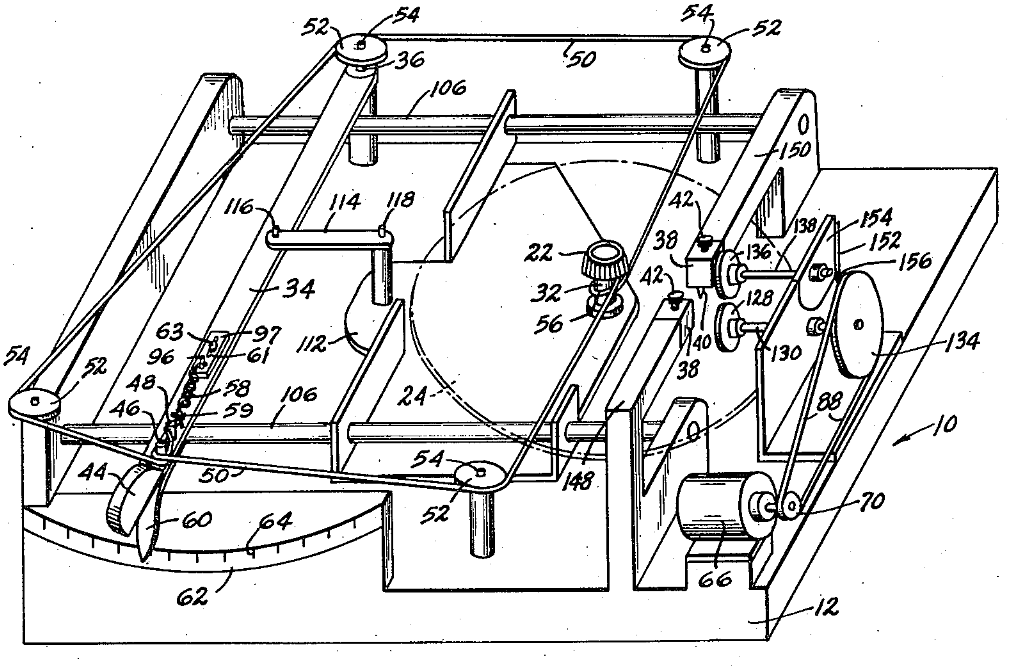
Fig. 4 is a somewhat diagrammatic perspective depicting another embodiment of the invention.

The embodiment depicted in Fig. 4 of the drawings contemplates sound translating members secured to the frame against horizontal movement and a carriage supported record engaging member. The guide rods 106 are supported by the frame in spaced relationship with respect to its base 12 to confine movement of the carriage 112 to rectilinear motion. The carriage is coupled with the arm 34 through a link 114 having one end pivoted to the pin 116 carried by the arm and the other end pivoted to the pin 118 carried by the carriage 112. The heads or sound translating members 38 include a recording head and a reproducing head secured by arms 148 and 150 respectively, to the frame 10. Whereas these sound translating members are fixed with regard to horizontal movement, their styli can be elevated by means of adjusting screws 42 sufficiently to permit records to be inserted and removed. Constant linear speed of the record 24 is effected in much the manner as described in conjunction with Fig. 3. When the motor 66 is energized, its pulley 70 drives the belt 88 which in turn rotates the pulley 134 carried by the shaft 130 to rotate the driving roller 128 which will be maintained in contact with the undersurface of the record 24 by pressure imposed upon the upper surface of the record by means of the pressure roller 136 carried by a shaft 138 and biased towards the upper surface of the record by means of a spring 152 bearing against the plate 154 in which the shaft 138 is mounted. The plate 154 is pivotally mounted relative to the frame 10 by means of a hinge 156. When the record 24 is engaged between the two rollers 128 and 136, it is rotated and will drive the splined record receiving member 22 whose shaft defines the cable drum 32. Here again, an intermediate portion of the cable is wrapped about the drum to form a loop 56, the ends of the cable being trained around a plurality of sheaves or pulleys 52 rotatably carried by shafts 54 supported on the frame, the opposite ends of the cable being bent oppositely about the guide 46 carried by the arm 34 and similarly about the post or guide 48 carried by the arm, the cable ends then being secured to one end of a spring 58 whose opposite end is anchored to the arm by means of the post 96. Thus it will follow that rotational movement of the record 24 will feed the cable 50 with respect to the drum 32 causing arcuate movement of the arm 34 about its pivot 36 with consequent rectilinear movement of the record carriage 112. Here again, manual shifting of the record relative to its sound translating heads and their styli or comparable elements is readily effected by pushing the finger piece 44 to the right or left as may be desired. The substantially positive drive of the cable by the drum is achieved in a manner similar to that described with reference to the preceding figures and the slippage of the cable on the drum to permit manual indexing is likewise similarly achieved.

Figures 5, 6, 7:
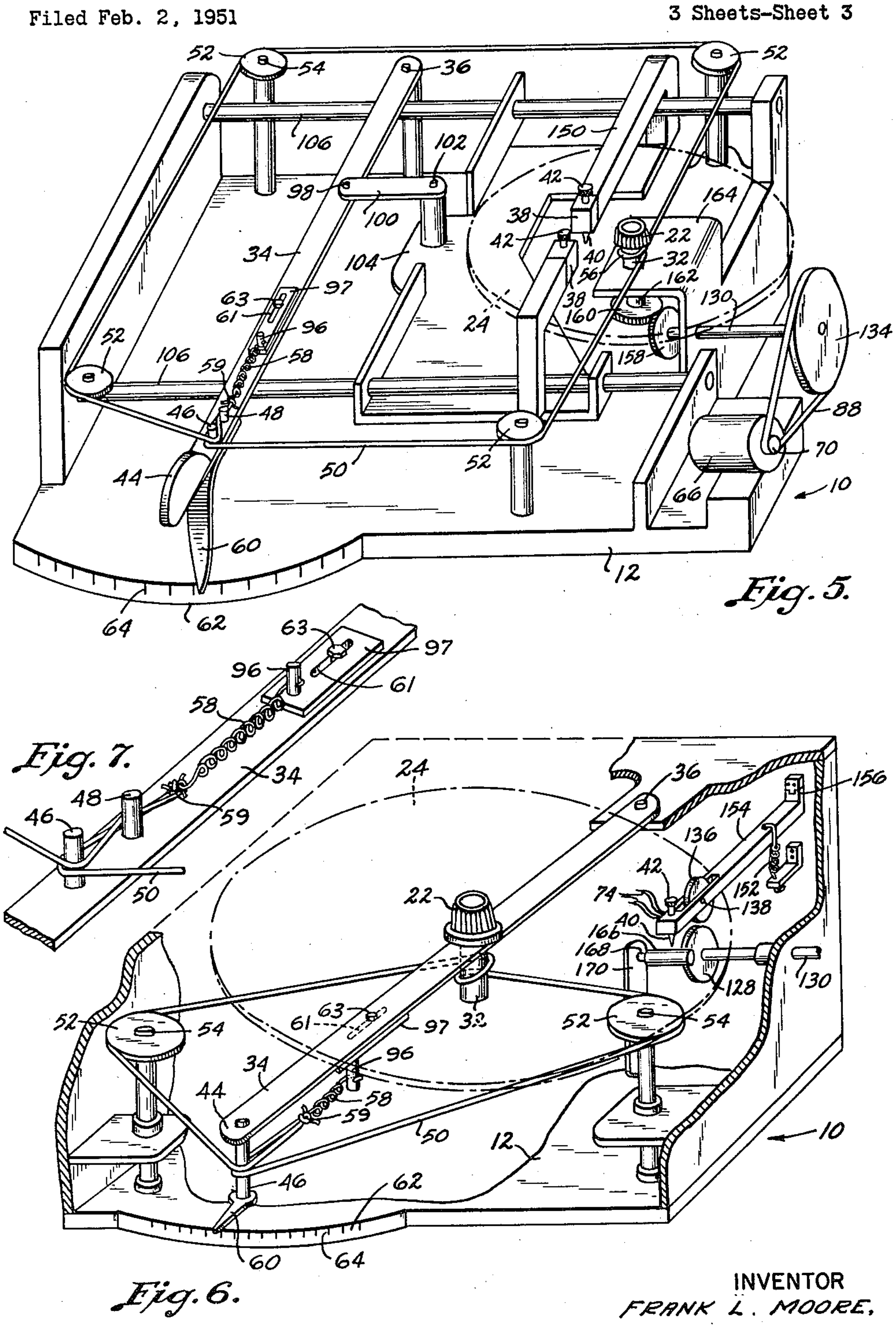
Fig. 5 is a somewhat diagrammatic perspective depicting another embodiment of the invention.
Fig. 6 is a somewhat diagrammatic perspective, partially broken away, depicting another embodiment of the invention.
Fig. 7 is an enlarged perspective view of a detail.

The embodiment of the invention depicted in Fig. 5 contemplates a pair of sound translating members supported on a carriage and a record engaging member having an axis which is fixed relative to the frame. In this case, when the motor 66 is energized, its pulley 70 drives the belt 88 and the pulley 134 whose shaft 130 carries a bevel gear 158 in engagement with a second beveled gear 160 secured to the lower end of a shaft 162 whose upper end carries the splined record receiving member 22 and an intermediate portion of which defines the cable drum 32. A bracket 164 carried by the frame 10 provides bearings for the shafts 130 and 162. The cable loop 56 is maintained in frictional engagement with the drum 32, as in the preceding figures, by the tension of the spring 58 whose one end is secured to a post 96 carried by the arm 34 and whose other end is secured to the two ends of the cable 50 which have been trained about the sheaves or pulleys 52 and the posts or guides 46 and 48 as fully explained in connection with the other figures. In this case, the recording head is supported by its arm 148 for movement with the carriage 104, and similarly, the reproducing head is supported by its arm 150 for movement with the carriage.

A comparison of the structures shown in Figs. 4 and 5 will indicate, that in effect, the sound translating members and record receiving members have been interchanged. It will be clear that a recording produced by one of these machines could be transcribed by the other, where the relative movement between the record and sound translating member is substantially the same in the two machines.

The embodiment of the invention depicted in Fig. 6 of the drawings contemplates a sound translating member fixed against horizontal movement relative to the frame and a record spindle carried directly by the pivoted arm. In this case the record receiving member 22 is directly secured to the cable drum 32 for rotation in a bearing supported by the pivoted arm 34. As has been true in connection with each of the other figures, the ends of the cable 50 engage substantially a common point provided by the guide 46 carried by the arm 34 at a distance from the axis of the arm 34 which is greater than the point of connection of the arm with the record engaging member and/or the sound translating member. In this case, it is the record engaging member 22 which is closer to the pivot 36 than the point at which the cable ends engage the arm. It will be noted that only one cable post or guide 46 has been provided on the arm in this case, indicating that various cable terminating means might be employed to effectively accomplish positive positioning of the arm by means of the cable and at the same time assure adequate tensioning of the cable. Moreover, in this figure the adjustable bracket 97 carrying the spring anchoring post 96 has received an inverted position as compared with the other figures. As in the other examples however, the bracket is adjusted relative to the arm until the required tension is imparted by the spring, whereupon, the clamping screw 63 is tightened. The driving motor has not been shown, but the shaft 130 carrying the driving roller 128 for engagement with the undersurface of the record 24, will be suitably driven by a power source suitably mounted on the frame or otherwise. A shaft 138 supports the pressure roller 136 for rotation in a slotted arm 154 which is joined to the frame by a hinge 156 and biased towards the record engaging position by means of a spring 152. An anvil 166, in the form of a roller carried by a shaft 168 which is in turn supported from the frame by means of a bracket 170 supports the record 24 at a point below the stylus or similar element 40 which is likewise carried by the arm 154 adjacent to the pressure roller. The vertical position of the stylus is rendered adjustable, as in the preceding forms, by means of an adjusting screw 42. By elevating the arm 154 against the force of the spring 152, a record can be introduced or removed with facility.

In the examples depicted in Figs. 3, 4 and 6 wherein the axis of the cable drum 32 moves relative to the frame, there is a desirable compensation effect for changes in the cable length in addition to that inherently provided by the spring. And in two of these examples, Figs. 3 and 6, where the movement of the axis of the cable drum has a component in the direction from which the cable advances with respect thereto, an additional and beneficial force multiplying effect is produced.

Whereas the six applications shown will serve to illustrate the most prominent features and the substantially universal adaptability of this invention, many other arrangements are contemplated and considered to be within the scope of the invention. Moreover, the disclosures have been of a diagrammatic nature and although typifying operative mechanisms in every instance, no effort has been made to depict refinements that would inevitably appear in conjunction with machines of this type produced for commercial use. Since these disclosures have been presented by way of illustration, the scope of the invention should not be restricted thereto beyond the language of the appended claims.

I claim:

1. Sound translating apparatus comprising a frame, a sound translating member carried by said frame for cooperation with a record, a record engaging member rotatably carried by said frame for movement with a record, record driving means carried by said frame for rotating said record engaging member, an arm pivotally carried by said frame for movement about an axis, means connecting one of said members with said arm at a predetermined distance from said axis for movement with said arm; and transmission means including a cable drum having an axis of rotation movable with one of said members, and a cable engaging said drum through an arc exceeding 180° interconnecting said record driving means with a portion of said arm more remote from said axis than said connecting means.

2. Sound translating apparatus comprising a frame, a sound translating member carried by said frame for cooperation with a record, a record engaging member rotatably carried by said frame, record driving means carried by said frame for rotating said record engaging member, an arm pivotally carried by said frame for movement about an axis, means connecting one of said members with said arm at a predetermined constant distance from said axis for movement with said arm, and transmission means containing a frictional connection providing slippage between said arm and driving means under forces applied externally to said arm, and said transmission means including a flexible cable defining a loop having a portion secured to said arm at a point more remote from said axis than said connecting means.

3. Sound translating apparatus as set forth in claim 2 wherein said transmission means includes reduction gearing.

4. Sound translating apparatus as set forth in claim 2 wherein said transmission means includes a relatively smooth cable drum about which said cable is looped.

5. Sound translating apparatus as set forth in claim 2 wherein the ends of the cable engage substantially a common point of the arm.

6. Sound translating apparatus as set forth in claim 2 wherein said transmission means includes a cable drum and tensioning means is connected to the cable to produce a positive frictional drive from the drum to the cable.

7. Sound translating apparatus as set forth in claim 6 wherein the tensioning means yields under a predetermined load axially of the cable to provide slippage of the cable relative to the drum.

8. Sound translating apparatus as set forth in claim 2 wherein the cable is trained over a guide carried by the arm and a spring connects the cable with the arm to maintain the cable in contact with the guide.

9. Sound translating apparatus as set forth in claim 2 wherein the cable is trained over guides carried by the frame.

10. Sound translating apparatus as set forth in claim 2 wherein a position indicator is connected to the arm remote from the pivotal axis of the arm.

11. Sound translating apparatus as set forth in claim 2 wherein one of the members is pivotally connected with the arm.

12. Sound translating apparatus as set forth in claim 2 wherein movements of the member connected to the arm are rectilinear.

13. Sound translating apparatus as set forth in claim 2 wherein one of the members is supported on a carriage connected with the arm.

14. Sound translating apparatus as set forth in claim 2 wherein said transmission means includes a cable drum having an axis of rotation movable with one of the members.

15. Sound translating apparatus as set forth in claim 2 wherein each of the members is supported on a carriage connected with the arm.

16. Sound translating apparatus as set forth in claim 2 wherein one of the members is secured against movement with the arm.

17. Sound translating apparatus as set forth in claim 2 wherein the arm provides a carriage having arcuate movement.

18. Sound translating apparatus as set forth in claim 2 wherein one of the members is rigidly connected to the arm.

19. Sound translating apparatus as set forth in claim 2 wherein the record engaging member is a turntable for disk records.

20. Sound translating apparatus as set forth in claim 2 wherein the record engaging member is a drum for belt records.

21. Sound translating apparatus as set forth in claim 2 wherein said transmission means includes a cable drum and said cable engages said drum through an arc exceeding 180°.

References Cited in the file of this patent

UNITED STATES PATENTS

| | | |
|---|---|---|
| 714,707 | Jones | Dec. 2, 1902 |
| 873,013 | Bornand et al. | Dec. 10, 1907 |
| 963,847 | Zackey | July 12, 1910 |
| 1,533,561 | Lindner | Apr. 14, 1925 |
| 1,649,477 | Kuchenmeister | Nov. 15, 1927 |
| 2,287,809 | Leonard | June 30, 1942 |
| 2,293,217 | Rieber | Aug. 18, 1942 |
| 2,357,033 | Thompson | Aug. 29, 1944 |
| 2,391,784 | Johnston | Dec. 25, 1945 |
| 2,452,133 | Leitner | Oct. 26, 1948 |

FOREIGN PATENTS

| | | |
|---|---|---|
| 161,782 | Germany | July 11, 1905 |
| 35,720 | Austria | Jan. 11, 1909 |
| 525,790 | France | Sept. 27, 1921 |